United States Patent
Lee et al.

(10) Patent No.: US 10,654,249 B2
(45) Date of Patent: May 19, 2020

(54) STYRENE COPOLYMER COMPOSITE FILM

(71) Applicant: INEOS STYROLUTION GROUP GMBH, Frankfurt (DE)

(72) Inventors: Jaehee Lee, Seoul (KR); JaeSung Han, Seoul (KR); Jong Hoo Lee, Seoul (KR)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 102 days.

(21) Appl. No.: 15/310,271

(22) PCT Filed: May 15, 2015

(86) PCT No.: PCT/EP2015/060739
§ 371 (c)(1),
(2) Date: Nov. 10, 2016

(87) PCT Pub. No.: WO2015/177047
PCT Pub. Date: Nov. 26, 2015

(65) Prior Publication Data
US 2017/0239917 A1    Aug. 24, 2017

(30) Foreign Application Priority Data
May 19, 2014 (EP) ................................. 14168897

(51) Int. Cl.
| B32B 15/082 | (2006.01) |
| B32B 15/20 | (2006.01) |
| B32B 27/30 | (2006.01) |
| B32B 21/08 | (2006.01) |
| B32B 15/08 | (2006.01) |
| B32B 7/12 | (2006.01) |
| C08J 7/04 | (2020.01) |

(52) U.S. Cl.
CPC .............. *B32B 15/082* (2013.01); *B32B 7/12* (2013.01); *B32B 15/08* (2013.01); *B32B 15/20* (2013.01); *B32B 21/08* (2013.01); *B32B 27/302* (2013.01); *C08J 7/0423* (2020.01); B32B 2307/402 (2013.01); B32B 2307/712 (2013.01); B32B 2307/75 (2013.01); B32B 2309/105 (2013.01); C08J 2325/08 (2013.01); C08J 2325/10 (2013.01); C08J 2355/02 (2013.01)

(58) Field of Classification Search
CPC ......... B32B 15/082; B32B 7/12; B32B 15/08; B32B 27/302; B32B 21/08; B32B 15/20; B32B 2307/402; B32B 2307/712; B32B 2309/105; B32B 2307/75; C08J 7/045; C08J 2355/02; C08J 2325/10; C08J 2325/08
See application file for complete search history.

(56) References Cited

U.S. PATENT DOCUMENTS

| 3,055,859 A | 9/1962 | Vollmert |
| 4,634,734 A | 1/1987 | Hambrecht et al. |
| 4,788,253 A | 11/1988 | Hambrecht et al. |
| 5,334,450 A | 8/1994 | Zabrocki et al. |
| 6,544,369 B1 * | 4/2003 | Kitamura ............... B32B 15/08 156/230 |
| 2005/0170124 A1 * | 8/2005 | Takahashi ............... B32B 27/20 428/40.1 |
| 2009/0092768 A1 * | 4/2009 | Hayoz ................... C07C 225/22 427/519 |
| 2013/0109804 A1 * | 5/2013 | Kusaka ............... C08F 290/067 524/590 |
| 2015/0147588 A1 | 5/2015 | Keckes et al. |

FOREIGN PATENT DOCUMENTS

| CA | 2143168 A1 | 8/1995 |
| DE | 1260135 B | 2/1968 |
| DE | 3149358 A1 | 6/1983 |
| DE | 3227555 A1 | 1/1984 |
| EP | 0534212 A1 | 3/1993 |
| EP | 0698637 A2 | 8/1994 |
| EP | 0669367 A1 | 8/1995 |
| EP | 2441583 A2 | 4/2012 |
| GB | 1124911 A | 8/1968 |
| GB | 1557426 A | 12/1979 |
| WO | 2013/178363 A2 | 12/2013 |

* cited by examiner

*Primary Examiner* — Nathan L Van Sell
(74) *Attorney, Agent, or Firm* — J.A. Lindeman & Co. PLLC

(57) ABSTRACT

The present invention relates to a composite film comprising a styrene copolymer layer (a), a metal layer (b), optionally a coloured layer (c), and a transparent polymer layer (d), wherein (b) is located between (a) and (d) and optionally (c) is located between (b) and (d). Moreover, the present invention refers to a method for producing a composite film and to the use of such composite film for laminating a surface or a part thereof. Finally, the present invention further relates to a product that is at least partly laminated by a composite film according to the present invention.

18 Claims, No Drawings

STYRENE COPOLYMER COMPOSITE FILM

The present invention relates to a composite film comprising a styrene copolymer layer (a), a metal layer (b), optionally a coloured layer (c), and a transparent polymer layer (d). The layer (b) is located between layers (a) and (d) and optionally layer (c) is located between layers (b) and (d). Moreover, the present invention refers to a method for producing a composite film and to the use of such composite films for laminating a surface or a part thereof. Finally, the present invention further relates to a product that is at least partly laminated by a composite film according to the present invention.

During the last decades, composite films have gained significant importance in various technical fields such as, exemplarily, for product packing and for protective and decorative lamination of a number of products. Often a metallic appearance, such as a stainless steel hairline appearance, is desired.

Such composite films used for laminating products are still often based on polyvinyl chloride (PVC). For laminating purposes, often a metallic appearance is desired, therefore, the PVC-based composites regularly comprise a metal layer. The main advantage of PVC as the main component of such composite films for lamination is that, in contrast to most other thermoplastics, PVC is comparably resistant to most chemical influences and is weatherproof.

PVC is, however, only poorly combinable with metallic surfaces. Accordingly, when such a PVC-based composite film is intended to have metallic appearance, such composite film will typically comprise at least six layers, i.e., a PVC layer, a metallizable layer, combinable with the PVC layer, a metal layer, a coloured layer, a polyethylene terephthalate (PET) layer and a transparent plastic layer. The production of such composite films is comparably laborious and cost-efficient.

Furthermore, PVC is sensitive to heating and, upon moderate heating, it already tends to generate toxic hydrogen chloride containing fumes. Upon higher temperatures above 140° C., PVC even starts to decompose. This severely hampers the applicability of PVC-based composite films in applications wherein higher temperatures may occur such as on ovens, radiators etc.

Moreover, a plain PVC moulding mass is inflexible and brittle. Therefore, considerably high amounts of plasticisers need to be added to the PVC moulding masses to enable the generation of a film thereof.

These high amounts of plasticisers, however, limit the usability of PVC-based composite films in sensitive fields such as for toys and food packing.

In the view of the above, there is still an unmet technical need for alternative weather-proof composite films that are less sensitive to heating, require lower amounts of plasticizers and are easier to produce.

Surprisingly, a composite film of e.g. only four layers, comprising a styrene copolymer component has been found that has good mechanical and chemical properties and is not difficult to produce.

In a first aspect, the present invention relates to a composite film comprising (or consisting of):
(a) a styrene copolymer layer;
(b) a metal layer;
(c) optionally a coloured layer; and
(d) a transparent polymer layer,
wherein layer (b) is located between layers (a) and (d), and optionally layer (c) is located between layers (b) and (d).

As used herein the term "film" may be understood in the broadest sense as any kind of planar flexible material. Herein, the terms "film", "foil" and "lamina" may be understood interchangeably. Typically, a film has a thickness of not more than 5 mm. Preferably, the composite film according to the present invention has a thickness of not more than 3 mm, more preferably not more than 2 mm, even more preferably not more than 1 mm, even more preferably not more than 750 µm, even more preferably not more than 500 µm, even more preferably 50-500 µm, even more preferably 70-400 µm, even more preferably 90-300 µm, even more preferably 100-250 µm, even more preferably 120-220 µm, in particular 150-200 µm.

As used throughout the present invention, all indications of a thickness of a layer may preferably be understood as the average thickness over the whole plain of said layer.

The term "composite film" as used herein may be understood in the broadest sense as any film that comprises at least two chemically and/or physically distinguishable layers, i.e., typically, at least two layers of different materials combined with another but remain separate and distinct. According to the present invention, the composite film comprises at least three layers, i.e., at least a styrene copolymer layer (a), a metal layer (b) and a transparent plastic layer (d). Optionally, the composite film further comprises a coloured layer (c) as a forth layer.

The person skilled in the art will notice that herein the materials of the layers, which are adjacent to another, differ from another with respect to their physical and/or chemical properties.

The layers of the composite film may be combined with another by means of an adhesive or may be combined with another without an adhesive. Preferably, there is (essentially) no adhesive between the styrene copolymer layer (a) and the metal layer (b). As far as a coloured layer (c) is present, there is preferably (essentially) no other layer between the coloured layer (c) and the transparent plastic layer (d), i.e., preferably, the coloured layer (c) is in direct adjacent to and in direct contact with the transparent plastic layer (d).

Preferably, the composite film is (essentially) free of polyethylene terephthalate (PET). Preferably, the composite film is (essentially) free of polyvinyl chloride (PVC). More preferably, the composite film is (essentially) free of PET and PVC. Even more preferably, the coloured layer (c) is directly adjacent to the transparent plastic layer (d) and the composite film is (essentially) free of PET and PVC. Particularly preferably, there is (essentially) no adhesive between the styrene copolymer layer (a) and the metal layer (b), the coloured layer (c), as far as present, is directly adjacent to the transparent plastic layer (d) and the composite film is (essentially) free of PET and PVC.

As used herein, each of the layers (i.e., the styrene copolymer layer (a), the metal layer (b), the coloured layer (c) and the transparent plastic layer (d)) may form a laminar part of the composite film chemically and/or physically distinguishable from the adjacent laminar part(s). Typically, each layer has a thickness of at least 1 nm. Preferably, each layer has a thickness of at least 10 nm, more preferably at least 100 nm, even more preferably at least 500 nm, even more preferably at least 1 µm, in particular more than 1 µm.

In the composite film of the present invention, the layers may be combined with another, i.e., laminated, by any means known in the art. Exemplarily, a layer may be first prepared as a film and subsequently laminated with another layer or composited layers. This may, exemplarily, be performed by means of an adhesion promoter (e.g., glue, gum, mucilage or a combination of two or more thereof). Alternatively, laminating of a film with another layer or composited layers may be performed by means of melting or party melting the film, the other layer and/or the composited layers. When laminating of a film with another layer or composited layers, both layers may be optionally subjected to heat and/or may be pressed against each other. Alternatively, a layer may also be printed, sprayed, chemically deposited, electro-deposited or otherwise deposited on another layer or composited layers.

The layers are each designated by the component they are mainly composed of. Therefore, the styrene copolymer layer (a) is mainly composed of styrene copolymer, i.e., comprises more than 50% (w/w) styrene copolymer. Preferably, the styrene co-polymer layer (a) comprises more than 60% (w/w) styrene copolymer, more preferably more than 70% (w/w) styrene copolymer, even more preferably more than 80% (w/w) styrene copolymer, even more preferably more than 90% (w/w) styrene copolymer, in particular more than 95% (w/w) styrene copolymer.

A styrene copolymer may be any copolymer or blend known in the art that comprises at least one styrene copolymer.

In a preferred embodiment the styrene copolymer layer (a) is an acrylonitrile styrene acrylate (ASA) copolymer layer, acrylonitrile butadiene styrene (ABS) copolymer layer or a styrene-butadiene copolymer layer.

A styrene-butadiene copolymer layer may be also understood as high impact polystyrene (HIPS).

More preferably, the styrene copolymer layer (a) is an acrylonitrile styrene acrylate (ASA) copolymer layer or an acrylonitrile butadiene styrene (ABS) copolymer layer. In a particularly preferred embodiment the styrene copolymer layer (a) is an acrylonitrile styrene acrylate (ASA) copolymer layer, such as the commercial copolymer Luran S (from Styrolution, Frankfurt).

Acrylonitrile styrene acrylate (ASA) may be any copolymer or blend known in the art that is mainly composed of acrylonitrile, styrene and acrylate monomer moieties.

An acrylate as used in the ASA may be any acrylic ester known in the art or acrylic acid. Preferably, the acrylate may be an alkyl acrylic acid ester, wherein the alkyl residue is an alkyl residue of 1 to 10 carbon atoms ($C_1$-$C_{10}$ alkyl residue). More preferably, the acrylate may be an alkyl acrylic acid ester, wherein the alkyl residue is an alkyl residue of 1 to 8 carbon atoms, even more preferably of 4 to 8 carbon atoms. Preferably, the acrylate may be selected from the group consisting of butyl acrylate (acrylic acid butyl ester), ethylhexyl acrylate (acrylic acid ethylhexyl ester), cyclohexyl acrylate (acrylic acid cyclohexyl ester), methyl acrylate (acrylic acid methyl ester), ethyl acrylate (acrylic acid ethyl ester), propyl acrylate (acrylic acid propyl ester) and pentyl acrylate (acrylic acid pentyl ester), heptyl acrylate (acrylic acid heptyl ester), octyl acrylate (acrylic acid octyl ester). Even more preferably, the acrylate may be selected from the group consisting of butyl acrylate, ethylhexyl acrylate and cyclohexyl acrylate. Highly preferably, the acrylate may be n-butyl acrylate or 2-ethylhexyl acrylate, particularly n-butyl acrylate.

The acrylate may optionally and preferably be copolymerized with one or more cross-linking comonomer(s). Such comonomer may exemplarily be a comonomer selected from the group consisting of an allyl (meth)acrylate (e.g., allyl methacrylate, divinylbenzene, diallyl maleate, diallyl fumarate or diallyl phthalate), triallyl cyanurate, allyl(meth)acrylat, more preferably the acrylic acid ester of tricyclodecane alcohol and/or dicyclopentadienyl acrylate.

Further, the acrylate may optionally be copolymerized with one or more other comonomer(s) such as, e.g., a diene (e.g., 1,3-butadiene, isoprene), alpha-methylstyrene, methacrylonitrile, methyl acrylate, ethyl acrylate, propyl acrylate, methyl methacrylate, ethyl methacrylate, phenylmaleimide, acrylamide and/or vinyl methyl ether.

Preferably, the ASA as used herein comprises the acrylate in a particular form, i.e., comprises acrylate-containing particles. These acrylate-containing particles may preferably comprise a graft base comprising acrylate and, optionally, one or more comonomers such as, exemplarily, those laid out above. Preferably, the graft base comprises more than 60% (w/w) acrylate, more preferably more than 70% (w/w) acrylate, even more preferably more than 80% (w/w) acrylate, even more preferably more than 90% (w/w) acrylate, in particular more than 95% (w/w) acrylate.

More preferably, the graft base is a copolymer of an acrylate (e.g., n-butyl acrylate) and one or more comonomer(s) acting as a cross-linking or grafting centre. Alternatively, the graft base may exemplarily be mainly composed of a terpolymer from an acrylate (e.g., n-butyl acrylate), vinyl methyl ether and a diene (e.g., butadiene or isoprene). Alternatively, the graft base may exemplarily be an acrylate-diene copolymer (e.g. an n-butyl acrylate-butadiene copolymer).

Preferably, the graft base bears latex-like properties and bears a glass-transition temperature of <25° C., more preferably of <20° C., even more preferably of <10° C. or even <0° C.

The acrylate-containing particles may further comprise a graft shell. Preferably, such graft shell may comprise one or more type(s) of vinylaromatic monomers. Preferably the graft shell may comprise styrene and/or a styrene derivative such as, e.g., alkylstyrene (e.g., alpha-methylstyrene) or a nucleosubstituted styrene (e.g., p-methylstyrene, tert.-butylstyrene). More preferably, the graft shell comprises styrene.

Preferably, the graft shell may further comprise one or more type(s) of vinyl cyanide monomers. Preferably the acrylate-containing particles may comprise acrylonitrile of methacrylonitrile. More preferably, the graft shell comprises acrylonitrile.

Even more preferably, the graft shell comprises one or more type(s) of vinylaromatic monomers and one or more type(s) of vinyl cyanide monomers. Particularly preferably, the graft shell comprises styrene and acrylonitrile.

Optionally, the graft shell may comprise one or more further type(s) of further comonomers such as, e.g., acrylic acid, methacrylic acid, maleic anhydride, methacrylonitrile, methacrylate, ethyl acrylate, propyl acrylate, methyl methacrylate, ethyl methacrylate, phenyl maleimide, acrylamide and/or vinyl methyl ether.

Optionally, the graft shell may comprise a block polymer or may be a randomly polymerized graft shell.

Particularly preferably, the acrylate-containing particles comprise a graft base (essentially) consisting of an acrylate (e.g., n-butyl acrylate) and, optionally, one or more comonomer(s) acting as a bifunctional cross-linking agents and a graft shell graft-polymerized on said graft base (essentially) consisting of styrene and acrylonitrile.

The acrylate-containing particles may be obtained from a commercial supplier. Alternatively, the acrylate-containing particles may be prepared by any means known in the art such as preferably by means of emulsion polymerization. The person skilled in the art will know several routs to obtain such acrylate-containing particles. Exemplarily, the acrylate-containing particles may be prepared according to DE 12 60 135 (cf., exemplarily columns 3 and 4)), U.S. Pat.

No. 3,055,859 (cf., exemplarily columns 2-4), DE-A 31 49 358 (cf., exemplarily pages 5-8) and/or DE-A 32 27 555 (cf., exemplarily pages 5-8)

Accordingly, the graft base comprising acrylate may exemplarily first be prepared by means of emulsion polymerization, wherein the acrylate (e.g., n-butyl acrylate) and, optionally, the one or more comonomer(s) acting as a cross-linking or grafting centre may be polymerized in an aqueous emulsion at temperatures of 20-100° C., preferably 50-80° C. On the graft base obtained hereby, a mixture comprising at least one vinylaromatic monomer (e.g., styrene), at least one vinyl cyanide monomer (e.g., acrylonitrile) and, optionally, one or more further comonomer(s) may be graft-polymerized, wherein also this step may be performed in an aqueous solution.

Alternatively, the acrylate-containing particles may also be prepared according to the method laid out in EP-B 0 534 212 (cf., exemplarily pages 4 and 5). Alternatively, the graft-polymerization may also be performed in two steps according to the method laid out in DE-A 31 49 358 (cf., exemplarily pages 5-8) and/or DE-A 32 27 555 (cf., exemplarily pages 5-8).

The resulting acrylate-containing particles may have a uni-, bi- or trimodal particle size distribution or may have a random particle size distribution.

The acrylate-containing particles may already be the ASA in the sense of the present invention or may optionally be blended with a polymer matrix.

Such polymer matrix may comprise one or more vinylaromatic monomer(s) (e.g., styrene or a styrene derivative such as, e.g., alkylstyrene (e.g., alpha-methylstyrene) or a nucleo-substituted styrene (e.g., p-methylstyrene, tert.-butylstyrene) and/or one or more vinyl cyanide monomer(s) (e.g., acrylonitrile, methacrylonitrile, methyl acrylate, ethyl acrylate, propyl acrylate, methyl methacrylate, ethyl methacrylate, phenyl maleimide, acrylamide, vinyl methyl ether. Preferably, the polymer matrix comprises styrene and/or acrylonitrile, more preferably styrene and acrylonitrile. In particular, the polymer matrix is a styrene-acrylonitrile (SAN) copolymer.

The polymer matrix may be prepared by any means known in the art such as, e.g., according to the method laid out in DE-A 31 49 358 (cf., exemplarily pages 9-13) and/or DE-A 32 27 555 (cf., exemplarily pages 9-13). Exemplarily, the polymer matrix may be prepared by copolymerization of styrene and acrylonitrile by means of mass polymerization, solvent polymerization, suspension polymerization or emulsion polymerization at commonly used temperatures and pressures.

Alternatively, the ASA as used herein may be an acrylonitrile-styrene-acrylate copolymer (terpolymer), wherein all three monomers (i.e., acrylonitrile, styrene and acrylate monomers) are directly copolymerized with another. This may be a random or block polymerization.

ASA and each of its potential components (i.e., the graft base, the graft shell, the acrylate-containing particles, and the further (co)polymer(s)) as used herein may, optionally, also comprise one or more additive(s).

An additive as used herein may be understood as any additive for polymer processing known in the art. Exemplarily, an additive may be a plasticizer, an antistatic, a lubricant, a foaming agent, an adhesion promoter, another blendable thermoplastic (co)polymer, a filling agent, an emulsifier, a surfactant, a flame retardant, a dye, a pigment, an anti-oxidant, a anti-hydrolysis stabilizer, a light stabilizer, a buffer agent, a heat stabilizer, a staining protector, a tightening agent and/or residuals of a buffer agent, a molecular weight modifier and/or a polymerization initiator.

A light stabilizer may be any light stabilizer known in the art such as, e.g., a compound or composition on the basis of benzophenone, benztriazole, cinnamic acid, organic phosphites, organic phosphonites and/or sterically hindered amines.

A lubricant may be any lubricant known in the art such as, e.g., a carbon hydrate of more than 10 carbon atoms in length (e.g., oil, paraffin wax, PE wax or PP wax), a fatty alcohol, a ketone, a fatty acid, a carbonic acid amide or a carbonic acid ester of 6-20 carbon atoms, glycerol, ethanediol and/or pentaerythrite.

An antioxidant may be any antioxidant known in the art such as, e.g., a phenolic antioxidant (e.g., an alkylated monophenol, an ester an sterically hindered amide such as, e.g., 3,5-di-tert butyl-4-hydroxyphenyl-propionic acid, 2,6-ditert-butyl-4-methylphenol, pentaerythrityl-tetrakis[3-(3,5-ditertiarbutyl-4-hydroxyphenyl)-propionate, N,N'-di-(3,5-ditert-butyl-4-hydroxyphenyl-propionyl)-hexamethylendiamine, or a benztriazole). Exemplarily, an antioxidant maybe such as enlisted in EP-A 0 698 637 and/or EP-A 0 669 367.

An emulsifier may be any emulsifier known in the art such as, e.g., an alkaline salt of an alkylic sulfonic acid or an alkylarylic sulfonic acid, an alkylsulfate or a resinate, in particular an alkaline salt of a fatty acid of 8-30 carbon atoms.

A polymerization initiator may be any polymerization initiator known in the art such as, e.g., a persulfate (e.g., potassium persulfate) or a redox-based polymerization initiator, A buffer agent may be any buffer agent known in the art such as, e.g., such suitable for adjusting the pH to approximately 6-9 such as, e.g., sodium bicarbonate and/or sodium pyrophosphate.

A molecular weight modifier may be any molecular weight modifier known in the art such as, e.g., a mercaptan, a terpinol and/or a dimeric alpha-methylstyrene.

In the view of the above, particularly preferably, acrylonitrile styrene acrylate (ASA) according to the present invention comprises:
  A acrylate-containing particles comprising
    A1 at least one type of graft base (essentially) consisting of an acrylate (e.g., n-butyl acrylate) and, optionally, one or more comonomer(s) acting as a bi-functional cross-linking agents and/or one or more additive(s); and
    A2 a graft shell graft-polymerized on said at least one graft base (essentially) consisting of styrene and acrylonitrile and, optionally, one or more additive(s); and
  B a polymer matrix comprising styrene and acrylonitrile and, optionally, one or more additive(s).

Preferably, the styrene copolymer, in particular when it is ASA, as used herein bears a melt volume flow rate (MVR) determined in accordance with the norm ISO 1133 in the version in force at the date of filing this application (i.e., at a temperature of 220° C. and a load of 10 kg) of 5-15 $cm^3$/10 min, more preferably of 6-12 $cm^3$/10 min, even more preferably of 6-10 $cm^3$/10 min, even more preferably of 7-8 $cm^3$/10 min, even more preferably of approximately 8 $cm^3$/10 min.

Preferably, the styrene copolymer, in particular when it is ASA, as used herein bears a charpy impact strength at 23° C. determined in accordance with the norm ISO 179/1eU in the version in force at the date of filing this application of 150-250 $kJ/m^2$, more preferably of 170-230 $kJ/m^2$, even more preferably of 180-220 kJ/m$^2$, even more preferably of 190-210 kJ/m$^2$, in particular of approximately 200 kJ/m$^2$.

Preferably, the styrene copolymer, in particular when it is ASA, as used herein bears a charpy impact strength at −30° C. determined in accordance with ISO 179/1eU in the version in force at the date of filing this application of 50-100 kJ/m$^2$, more preferably of 60-90 kJ/m$^2$, even more preferably of 60-80 kJ/m$^2$, in particular of approximately 70 kJ/m$^2$.

Exemplarily, the styrene copolymer as used herein is a Luran S polymer (type of ASA obtainable from Styrolution GmbH, Frankfurt am Main, Germany). Preferably, the styrene copolymer as used herein is a Luran S 757 polymer, more preferably a Luran S 757RE polymer, in particular Luran S 757RE Black.

In a preferred embodiment, the composite film of the present invention comprises the layer structure (a)-(b)-(c)-(d), wherein (a), (b), (c) and (d) are defined as laid out herein throughout the present invention. One preferred embodiment is a composite film from ASA (a), sputtered aluminium (b), pattern printing layer (c) and UV-protection film (d).

In an alternative preferred embodiment, the composite film of the present invention comprises the layer structure (a)-(b)-(d), wherein (a), (b) and (d) are defined as laid out herein throughout the present invention.

Optionally, the composite film of the present invention may also (essentially) consists of the layer structure (a)-(b)-(c)-(d) or the layer structure (a)-(b)-(d). As used herein, the term "(essentially) consist" may be understood broadly in that the respective layers (a), (b) and (d) and, optionally, (c) altogether constitute for at least 80% by weight, preferably at least 90% by weight, more preferably at least 95% by weight, in particular at least 98% by weight of the whole composite film.

Exemplarily, the composite film may be stored as sheet, a pack of sheets, folded or coiled.

As used throughout the present invention, the terms "coiled" and "furled" may be understood interchangeably. A coiled composite film may form a peelable roll of composite film.

The styrene copolymer layer (a) may be texturized (i.e., moderately 3D-patternd) or smooth.

In a preferred embodiment, the styrene copolymer layer (a) comprises a texturized pattern like stainless steel hairline.

As used herein the term "stainless steel hairline" may be understood in the broadest sense as a surface appearance of stainless steel bearing a surface finish based on fine or minute lines on the stainless steel surface.

Therefore, the appearance is similar or ((essentially)) equal to brushed stainless steel. Preferably, the stainless steel hairline surface bears (essentially) parallel lines.

The styrene copolymer layer (a) of the composite film according to the present invention may have any thickness that is suitable for a film, i.e., typically a thickness of not more than 5 mm.

In a preferred embodiment, the styrene copolymer layer (a) has a thickness of 50-1000 µm, preferably 75-500 µm, more preferably 100-300 µm, in particular 150-200 µm; often an ASA-layer (a) of 100-300 µm thickness is used, e.g. with an aluminium-layer b.

The metal layer (b) of the composite film according to the present invention may be any metal layer (b) suitable for being composed in a composite film according to the present invention.

The metal layer (b) is mainly composed of metal or metal alloy, i.e., comprises more than 50% (w/w) metal or metal alloy. Preferably, the metal layer (b) comprises more than 60% (w/w) metal or metal alloy, more preferably more than 70% (w/w) metal or metal alloy, even more preferably more than 80% (w/w) metal or metal alloy, even more preferably more than 90% (w/w) metal or metal alloy, in particular more than 95% (w/w) metal or metal alloy.

Exemplarily, the metal herein may be aluminium, copper, tin and/or gold or the metal alloy may comprise aluminium, copper, tin and/or gold.

Exemplarily, the metal layer may be sputtered on the surface of the styrene copolymer layer. Alternatively, the metal layer may be electrophoretically or otherwise deposited on the surface of the styrene copolymer layer. Alternatively, the metal layer may be a metal foil (e.g., an aluminium foil, a copper foil, a tin foil or a gold foil) added to the styrene copolymer layer as a whole.

In one embodiment, the metal layer (b) is an aluminium layer, in particular 4-6 µm.

This may be understood in the broadest sense in that the metal layer (b) that is an aluminium layer comprises at least 80% (w/w) aluminium, preferably more than 90% (w/w) aluminium, in particular more than 95% (w/w) aluminium.

The metal layer (b) may have any thickness suitable for a layer comprised in the composite film according to the present invention. Exemplarily, a gold layer may be obtainable in a thickness of less than 10 µm, whereas other metal layers may require far thicker layers.

In a preferred embodiment, the metal layer (b) has a thickness of 0.1-50 µm, preferably 0.5-20 µm, more preferably 1-10 µm, in particular 4-6 µm.

As indicated above, the coloured layer (c) is optionally present in the composite film according to the present invention. Therefore, the composite film may comprise a coloured layer (c) or may not comprise a coloured layer (c).

In a preferred embodiment, the composite film comprises a coloured layer (c).

Such coloured layer (c) may be any chromatic layer that is suitable for being composed in a composite film according to the present invention. The coloured layer (c) may be a layer of dried paint or ink. Alternatively, the coloured layer (c) may be a plastic layer comprising one or more dye(s), e.g., a stained plastic film.

A paint or ink or a plastic layer comprising one or more dye(s) as used herein may optionally also comprise one or more additive(s) as those described in the context of styrene copolymer above. Further, the paint or ink may also comprise one or more solvent(s) which may be organic and/or inorganic solvent(s).

In a more preferred embodiment, the composite film comprises a coloured layer (c) that is a printed layer, such as a pattern printing layer. This is layer (c) often is combined with an ASA-layer (a) of 100-300 µm thickness and with an aluminium-layer (b).

Therefore, the coloured layer (c) comprises dried printable ink that has been either printed on the metal layer (b), printed on a plastic film serving the transparent plastic layer (d) or printed on a plastic film that is subsequently laminated with the other parts of the composite film according to the present invention (i.e., the styrene copolymer layer (a), the metal layer (b) and the transparent plastic layer (d)).

The coloured layer (c) may be monochromatic or may be patterned.

In a more preferred embodiment, the coloured layer (c) is a pattern printed and/or pattern embossed layer, and/or a hologram in case of no texturized pattern like stainless steel hairline on the styrene copolymer layer (a).

Herein, the pattern may be any pattern. Exemplarily, the pattern may imitate a natural surface such as, e.g., a wooden, lithic or tiled surface or a metallized surface different from the surface of the metal layer (b). Alternatively, the pattern may be a floral, fabric-imitating, felt-imitating, knitted material-imitating or fantasy pattern.

Optionally, the coloured layer (c) that is a pattern printed layer may also comprise two or more sub-layers. Optionally, it may also comprise or be a holography.

The surface of the coloured layer (c) may be smooth or may be 3D-patterned.

The term "hologram" may be understood in the broadest sense as generally understood in the art. Those skilled in the art will know that, typically, a hologram bases on geometrically diffused reflection.

The coloured layer (c) may have any thickness suitable for a layer comprised in the composite film according to the present invention. The thickness of the coloured layer (c) may also depend on its chemical nature.

In a preferred embodiment, the composite film comprises a coloured layer (c) that has a thickness of 0.1-50 µm, preferably 0.5-20 µm, more preferably 1-10 µm, in particular 4-6 µm.

The coloured layer (c) is covered and thereby protected against environmental influences by a transparent plastic layer (d). This may be any transparent plastic layer (d) suitable for this purpose.

The transparent plastic layer (d) is mainly composed of one or more transparent polymer(s), i.e., comprises more than 50% (w/w) one or more transparent polymer(s).

Preferably, the one or more transparent polymer(s) layer comprises more than 60% (w/w) one or more transparent polymer(s), more preferably more than 70% (w/w) one or more transparent polymer(s), even more preferably more than 80% (w/w) one or more transparent polymer(s), even more preferably more than 90% (w/w) one or more transparent polymer(s), in particular more than 95% (w/w) one or more transparent polymer(s). The surface of the transparent plastic layer (d) may be smooth or may be 3D-patterned.

In a preferred embodiment, the transparent polymer layer (d) is a UV-protective, scratch resistant, glossy, chemically inert and/or weatherproof layer.

Therefore, when the transparent plastic layer (d) is a UV-protective layer, it preferably absorbs at least 10%, more preferably at least 20%, more preferably at least 30% or more of the UV light of a wavelength of 220 nm. The transparent plastic layer (d), that is a UV protective layer, preferably comprises at least one stabiliser against ultraviolet (UV) light (UV stabiliser) that can be any UV stabiliser known in the art.

Exemplarily, such UV stabiliser may be a combination of an absorber (e.g., Tinuvin P and/or a benztriazole derivative, a benzophenone) and a sterically hindered amine (HALS, Hindered Amin Light Stabilizer) (e.g., one or more of commercial products: Tinuvin 770, Tinuvin 765, Chimassorb 944).

When the transparent plastic layer (d) is a scratch resistant layer, its hardness is preferably higher than that of the metal layer (b) and/or, as far as present, as the coloured layer (c). Optionally, it is also higher than that of the styrene copolymer layer (a). Optionally, the hardness may be determined according to ISO 1518-1 (e.g., version of 2011), applicable with a standardized constant pressure and/or with an increasing pressure.

When the transparent plastic layer (d) is a glossy layer, it preferably has a gloss at a 60° angle of more than 20%, preferably more than 40%, more preferably more than 50%, even more preferably more than 60%, even more preferably more than 70%, in particular more than 80%. Optionally, the gloss at a 60° angle may be determined according to DIN EN ISO 2813 (e.g., version of 2012).

When the transparent plastic layer (d) is a weatherproof layer, it may protect the composite film against influences of water and temperature alterations. Optionally, the weathering may be determined according to ISO 2810. Preferably, the transparent plastic layer (d) bears higher resistance to weathering than the metal layer (b) and/or, as far as present, the coloured layer (c). Preferably, the transparent plastic layer (d) is not corrosive and thereby may protect the metal layer (b) from corrosion.

In a preferred embodiment, the transparent polymer layer (d) bears an elongation of break of at least 10% in a stress/strain test according to ISO 527 (in the version in force at the date of filing this application, i.e., in May 2015). Exemplarily, ISO 527 may be ISO 527-1 in the version of 2012.

More preferably, the transparent polymer layer (d) bears an elongation of break of at least 15%, even more preferably of at least 20%, in a stress/strain test according to ISO 527 (in the version in force at the date of filing this application).

The thickness of the transparent plastic layer (d) may depend on the polymers comprised therein. In a preferred embodiment, the transparent polymer layer (d) has a thickness of 0.1-100 µm, preferably 0.5-50 µm, more preferably 2-20 µm, in particular approximately 10-15 µm.

Exemplarily, the transparent polymer layer (d) may comprise or (essentially) consist of polystyrene(s), styrene-acrylonitrile copolymer(s) (SAN), styrene-butadiene copolymer(s) (SB), acrylonitrile butadiene styrene copolymer(s) (ABS), polymethacrylate(s), poly(methyl methacrylate)(s), (methyl)methacrylate-butadiene-styrene copolymer(s) ((M)MBS), acrylonitrile styrene acrylate (ASA), styrene-maleic acid anhydride copolymer(s) (SMA), styrene-maleic acid anhydride-butadiene copolymer(s) (SMAB), styrene butadiene methylmethacrylate copolymer(s) (SBMMA), methyl methacrylate acrylonitrile butadiene copolymer(s), polyethylene, polypropylene, polydimethylsiloxane (PDMS), polylactone(s) (e.g., poly(caprolactone) (PCL)), polyester(s) (e.g., poly(lactide) (PLA)), poly(methyl methacrylate) (PMMA) or a blend of two or more thereof.

Preferably, the transparent polymer layer (d) does not comprise halogenated polyvinyl (e.g., polyvinyl chloride (PVC)) and/or polycarbonate (e.g., polyethylene terephthalate (PET)).

The transparent plastic layer (d) as used herein may optionally also comprise one or more additive(s) as those described in the context of the styrene copolymer, in particular when it is ASA, above.

In the view of the above, according to a particularly preferred embodiment, the composite film comprises a layer structure of (a)-(b)-(c)-(d) and has a thickness of 100-350 µm, preferably wherein (a) the styrene copolymer layer (a) has a thickness of less that 200 µm;
(b) the metal layer (b) has a thickness of less than 15 µm;
(c) the coloured layer (c) a thickness of less than 15 µm; and
(d) the transparent polymer layer (d) a thickness of less than 20 µm.

Even more preferably, the composite film comprises a layer structure of (a)-(b)-(c)-(d) and has a thickness of 104-340 µm, wherein (a) the styrene copolymer layer (a) has a thickness of 100-300 µm;
(b) the metal layer (b) has a thickness of 1-10 µm;
(c) the coloured layer (c) a thickness of 1-10 µm; and
(d) the transparent plastic layer (d) a thickness of 2-20 µm.

Particularly preferably, the composite film comprises a layer structure of (a)-(b)-(c)-(d) and has a thickness of 120-225 µm, wherein
(a) the styrene copolymer layer (a) has a thickness of 100-200 µm;
(b) the metal layer (b) has a thickness of 4-6 µm;
(c) the coloured layer (c) a thickness of 4-6 µm; and
(d) the transparent plastic layer (d) a thickness of 10-15 µm.

Alternatively, the composite film comprises a layer structure of (a)-(b)-(d) and has a thickness of 100-350 µm, preferably 104-340 µm, in particular 120-225 µm preferably wherein
(a) the styrene copolymer layer (a) has a thickness of less that 200 µm, preferably of 100-300 µm, in particular 100-200 µm;
(b) the metal layer (b) has a thickness of less than 15 µm, preferably 1-10 µm, in particular 4-6 µm; and
(d) the transparent polymer layer (d) a thickness of less than 20 µm, preferably 2-20 µm, in particular 10-15 µm.

The composite film according to the present invention may be the plain composite film as described above or may be equipped with one or more means for being fixed to a surface.

The surface of the composite film may be smooth or may be 3D-patterned. A 3D-pattern may be obtained from a printed pattern of the coloured layer (c) when said layer has a thickness of at least 100 pm. Alternatively, a 3D-pattern may be obtained from a using a pre-patterned transparent plastic layer (d). Alternatively, a 3D-pattern may be obtained by means of pressing the pattern into the composite film. The 3D-pattern may comprise burls, scratches and/or notches.

In a preferred embodiment, the composite film is an adhesive composite film further comprising
(e) at least one adhesive coating on at least one of the two outer surfaces of said composite film.

Such adhesive composite film comprising an adhesive coating may also be designated as adhesive-coated composite film.

As used herein, the term "adhesive" may be understood in the broadest sense as any sticky and gluey compound, therefore, any compound facilitating adherence to a surface of another object that is not sticky itself. More preferably, the composite film is an adhesive composite film further comprising an adhesive coating on one of the two outer surfaces. Particularly preferably, the composite film is an adhesive composite film further comprising an adhesive coating on the outer surface of the styrene copolymer layer (a) opposed to its surface adjacent to the metal layer (b).

This adhesive coating may be any coating known for this purpose. Exemplarily, the adhesive coating may comprise glue, gum, mucilage or a combination of two or more thereof. Particularly preferably, the adhesive coating is reversibly adherent and sticky to a variety of surfaces such as, e.g., in plastic, metal, wooden, porcelain, cement, concrete, ceramic, lacquer coated, paper, cardboard or lithic surfaces.

The adhesive coating may have any thickness. Preferably, the adhesive coating has a thickness of less than 500 µm, more preferably less than 250 µm, even more preferably less than 200 µm, even more preferably less than 150 µm, even more preferably less than 100 µm, in particular less than 50 µm, less than 20 µm or even less than 10 µm.

The adhesive coating may cover one or more whole surface(s) of the composite film or may be patterned on the surface(s) (e.g., in form of a punctual, striped and/or squared pattern). The adhesive composite film may exemplarily used for laminating surfaces, as an adhesive label (e.g., stick-on label) and/or as a lid for hollowware (e.g., a container, a cup, a beaker or a bottle).

The adhesive coating as used herein may optionally also comprise one or more additive(s) as those described in the context of the styrene copolymer, in particular when it is ASA, above.

The adhesive coating may be directly accessible or may be reversibly covered by a strippable non-adhesive film.

When it is directly accessible, adhesive coating may preferably be reversibly and repeatedly adhesive. Then, the adhesive composite film may optionally be stored as a coiled adhesive composite film. Then, the adhesive coating may also contact the other (typically non-adhesive) surface of the composite film. This may lead to a peelable roll of adhesive composite film.

When it is intended to be used, the roll may then be unpeeled and the adhesive composite film comprising a repeatedly adhesive coating may then be used for laminating a surface of an object.

In a preferred embodiment, the at least one adhesive coating is reversibly covered by a strippable non-adhesive film.

The strippable non-adhesive film may exemplarily be a plastic or paper film. Before the adhesive-coated composite film is fixed to a surface, typically the respective strippable non-adhesive film is removed from the adhesive coating.

The composite film bearing an adhesive coating that is reversibly covered by a strippable non-adhesive film can be comfortably stored as the non-adhesive then film typically protects adhesive coating against drying out and impurity sticking to the adhesive coating.

The strippable non-adhesive film may preferably have a thickness of not more than 5 mm, more preferably not more than 500 µm, even more preferably not more than 200 µm. The strippable non-adhesive film as used herein may optionally also comprise one or more additive(s) as those described in the context of the styrene copolymer, in particular when it is ASA, above.

The composite film, independent on whether it is adhesive-coated or not and whether it is an adhesive-coated composite film covered by a strippable non-adhesive film, may be stored in any form. Exemplarily, the adhesive composite film with covered adhesive coating may be stored as sheet, a pack of sheets, folded or coiled.

The composite film according to the present invention may be produced by any means according to the present invention.

A further aspect of the present invention relates to a method for preparation of a composite film, comprising (or consisting of) the steps:
(i) providing a styrene copolymer film, optionally comprising texturized pattern like stainless steel hairline;
(ii) metallizing said styrene copolymer film with a metal layer to a styrene copolymer-metal composite film;
(iii) optionally depositing a coloured layer on the metallized surface of the styrene copolymer-metal composite film obtained from step (ii), in particular in case of no texturized pattern like stainless steel hairline on the styrene copolymer layer (a); and
(iv) coating said metallized surface of the styrene copolymer-metal composite film obtained from step (ii) or said coloured layer by printing and/or embossing on the surface of said styrene copolymer-metal composite film according to step (iii) with a transparent polymer layer.

Herein, the styrene copolymer is preferably acrylonitrile styrene acrylate (ASA), acrylonitrile butadiene styrene (ABS) or styrene-butadiene copolymer, in particular acrylonitrile styrene acrylate (ASA).

Herein, metallizing preferably means sputtering, evaporation and/or depositing.

Depositing a coloured layer of step (iii) is preferably printing by printing roll, transferring by transcription film and/or embossing by embossing roll.

In a preferred embodiment, the method for preparation of a composite film comprises the steps:
(i) providing a styrene copolymer film;
(ii) laminating said styrene copolymer film with a metal layer to a styrene copolymer-metal composite film;
(iii) depositing a coloured layer on the metallized surface of the styrene copolymer-metal composite film obtained from step (ii); and
(iv) coating said coloured layer deposited on the surface of said styrene copolymer-metal composite film according to step (iii) with a transparent polymer layer.

Herein, the styrene copolymer is preferably acrylonitrile styrene acrylate (ASA), acrylonitrile butadiene styrene (ABS) or styrene-butadiene copolymer, in particular acrylonitrile styrene acrylate (ASA).

Alternatively, the method for preparation of a composite film comprises the steps:
(i) providing a styrene copolymer film;
(ii) laminating said styrene copolymer film with a metal layer to a styrene copolymer-metal composite film; and
(iv) coating said metallized surface of the styrene copolymer-metal composite film obtained from step (ii) with a transparent polymer layer.

The composite film obtainable by this method may be a composite film as described in detail above. Therefore, all definitions and preferred embodiments as laid out above may also, mutatis mutandis, apply to the method accordingly.

In particular, the styrene copolymer film may preferably have the characteristics as specified for the styrene copolymer layer (a) above. Likewise, the metal layer may preferably have the characteristics as specified for the metal layer (b) above.

The styrene copolymer film may be provided by any means. Exemplarily, the styrene copolymer film may be obtained from a commercial supplier. The person skilled in the art will further know technical means for preparing such film himself, e.g. by means of blow moulding, extruding, calendaring or casting.

The step (ii) of laminating the styrene copolymer film with a metal layer to a styrene copolymer-metal composite film may be performed by any means. Preferably, the styrene copolymer film may be metallized by means of depositing the metal or a metal alloy (e.g., aluminium, copper, tin, gold or a metal alloy) on the surface of the styrene copolymer film.

More preferably, the styrene copolymer film may be metallized by means of sputtering the metal on the surface of the styrene copolymer film. Alternatively, the styrene copolymer film may be metallized by depositing metals by means of evaporation, deposition in vacuum, electrophoretically or by any other means known in the art.

Alternatively, the styrene copolymer film may be metallized by means of combining it with a metal foil. Then, the styrene copolymer film and the metal foil may be laid on top of each other by means of counter-rotating rollers. Concomitantly or subsequently, the styrene copolymer film and the metal foil may be fixed at another by any means such as, e.g., by means of an adhesion promoter (e.g., a glue, a gum, a mucilage or a combination of two or more thereof) and/or by melting or partly melting the styrene copolymer film on the metal foil and subsequent cooling of the styrene copolymer-metal composite film.

The step (iii) of depositing a coloured layer (c) on the metallized surface of the styrene copolymer-metal composite film may be performed by any means.

Preferably, the coloured layer (c) is obtained by means of depositing a paint or ink on the metallized surface of the styrene copolymer-metal composite film. Particularly preferably, the coloured layer (c) is printed on the metal layer (b), either monochromatic or pattern printed. Alternatively, the coloured layer (c) may also be sprayed, chemically deposited, electro-deposited or otherwise deposited on the styrene copolymer-metal composite film. The coloured layer (c) may also be designed to provoke geometrically diffused reflection and may, therefore, serve as a hologram.

The step (iv) of coating the coloured layer (c) deposited on the surface of said styrene copolymer-metal composite film with a transparent plastic layer (d) may be performed by any means.

Preferably, a transparent plastic film either commercially obtainable or producible by standard means (e.g. by means of blow moulding, extruding, calendaring or casting) may be used for laminating the coloured layer (c) deposited on the surface of said styrene copolymer-metal composite film. Then, the transparent plastic film and the styrene copolymer-metal composite film comprising a coloured layer (c) may preferably be laid on top of each other by means of counter-rotating rollers, wherein the coloured layer (c) gets in contact with the transparent plastic film. Concomitantly or subsequently, the two films are fixed at another by any means such as, e.g., by means of an adhesion promoter (e.g., a glue, a gum, a mucilage or a combination of two or more thereof) and/or by melting or partly melting the transparent plastic layer (d) and/or the coloured layer (c) being in contact with another. Alternatively, the transparent plastic layer (d) may also be obtained by means of printing, spraying, chemically depositing or electro-depositing on the coloured layer (c).

Optionally, the obtained composite film may be folded or coiled for storage and transport purposes.

Optionally, the obtained composite film may also be equipped with an adhesive coating.

In a preferred embodiment, the method further comprises the further step (v) of coating the composite film obtained from step (iv) with at least one adhesive coating on at least one of the two outer surfaces of said composite film.

More preferably, one of the two outer surfaces of the composite film is coated with an adhesive coating. Particularly preferably, the outer surface of the styrene copolymer layer (a) opposed to its surface adjacent to the metal layer (b) is coated with an adhesive coating.

The step (v) of coating the composite film with an adhesive coating may be performed by any means. Exemplarily, it may be performed by means of printing, spraying, chemically depositing or electro-depositing on the coloured layer (c).

Optionally, the method further comprises the further step (vi) of covering said at least one adhesive coating of step (v) reversibly by a strippable non-adhesive film.

This step may be performed by any means such as, e.g., by means of laminating the adhesive-coated composite film obtained from step (v) with the strippable non-adhesive film by means of counter-rotating rollers, wherein the strippable non-adhesive film gets in contact with the adhesive coating of the composite film. Here, preferably, the strippable non-adhesive film inherently sticks to the adhesive coating of the composite film.

The composite film as laid out above may be used to laminate products of parts of products. In this context, the composite film may serve as a protective and/or decorative lamination of a product or part thereof and/or may serve as a sealing of a hollow-ware (e.g., a container, a cup, a beaker or a bottle), in particular as a pull-tab lid (also known as tear open lid). Exemplarily, hollowware of diary products (e.g., a yoghurt beaker or a milk bottle) may be sealed by means of a composite film of the present invention or a composite film obtainable by the method of the present invention.

Accordingly, a further aspect of the present invention relates to a product that is at least partly laminated by a composite film according to the present invention and/or a composite film obtained from a method according to the present invention.

In this context, a product may be any product known in the art. Preferably, the product is intended to get in contact with temperature alterations, humidity alterations, ultra violet (UV) light and/or other environmental influences. Preferably, the product may at least partly have a comparably inflexible surface, therefore a surface that is more in-flexible that the composite film according to the present invention such as, e.g., a plastic, metal, wooden, porcelain, cement, concrete, ceramic, lacquer coated, paper, card-board or lithic surface or a surface comprising one or elements of the aforementioned surfaces.

In a preferred embodiment, the product is selected from the group consisting of:
an article of furniture, in particular a cupboard, a shelf, a chair, a bench, a table or a part of one of the aforementioned;
a domestic appliance, in particular a washing machine, a dish washer, a refrigerator, a freezer, a coffee machine, a microwave, an oven, a cooking stove, a blender, a mixer, an electric toothbrush unit, a shaver, cooking or baking equipment or a part of one of the aforementioned;
an electronic device, a consumer electronics device, a professional electronic device or a part of one of the aforementioned;
a consumer good or food packing, in particular a bottle or a box or a part of one of the aforementioned;
an interior or exterior part of a building, in particular a window, a door, a window frame, a door frame, an air conditioner, a radiator, bathroom interior equipment, kitchen interior equipment, a pipe or a part of one of the aforementioned;
an interior or exterior part of a vehicle, in particular an automotive, a truck, a motorcycle, a bike, a scooter, a train, a boat or a part of one of the aforementioned;
an interior or exterior part of an aircraft, in particular a plain, a helicopter, a gyrocopter or a part of one of the aforementioned;
a part of a piece of sports equipment, in particular a surfboard, diving equipment, a balloon, a glider, a dirigible or a part of one of the aforementioned; and
a lamp, in particular a reflector of a lamp.

Therefore, in a further aspect, the present invention relates to the use of a composite film according to the present invention and/or a composite film obtained from a method according to the present invention for laminating a surface or a part thereof.

The surface may be an elastic or inelastic surface. In a preferred embodiment, the surface is comparably inelastic. As used herein, the term "comparably inelastic" may be understood in the broadest sense. Preferably, said term may be understood as being less elastic than the composite film according to the present invention.

In a more preferred embodiment, the surface is a metal, wooden, (co)polymer, porcelain, cement, concrete, ceramic, lacquer-coated, paper, cardboard or lithic surface or a surface comprising one or elements of the aforementioned surfaces, in particular wherein said surface is a metal or wooden surface. In a particularly preferred embodiment, the surface is a metal or wooden surface.

The examples and claims further illustrate the present invention.

EXAMPLES

TABLE 1

Two different composite films according to the invention are prepared.

| Example | Components |
|---|---|
| Example 1 | (a) Luran S 757RE layer of a thickness of 250 μm<br>(b) sputtered aluminium film of a thickness of 5 μm<br>(c) pattern printing of a thickness of 5 μm<br>(d) UV protective transparent polymer layer of a thickness of approximately 10-15 μm |
| Example 2 | (a) Luran S 757RE layer of a thickness of 200 μm<br>(b) sputtered aluminium film of a thickness of 5 μm<br>(c) pattern printing of a thickness of 5 μm<br>(d) UV protective transparent polymer layer of a thickness of approximately 10-15 μm |

Luran S is an ASA-copolymer of Styrolution (Germany)

These coatings are tested by the following test methods:

Erichsen Test:
Cross cutting 5 mm interval pushing by 8 mm in depth in Erichsen tester Boiling Test:
Contacting with water of 95° C. for 2 h, subsequently maintain it for 1 h at room temperature and cross cutting base on Bending Test:
Bending by 180° in a curved manner Constant temperature humidity test:
Incubating the composite film at a humidity of 90% at 60° C. for 24 h after Erichsen Test Pencil hardness:
Using Mitsibishi Uni pencil, checking pencil trace mark when down at 45° direction with 500 g, comparison with common pencil hardness degrees B, 2B, HB, H, etc.

The following results are obtained:

TABLE 2

| Results | | |
|---|---|---|
| Example | Test method | Result |
| Example 1 | Erichsen Test | no peeling |
| | Boiling Test | no change on the surface |
| | Bending Test | no change |
| | Constant temperature humidity test | no peeling |
| | Pencil hardness | approximately 2B |
| Example 2 | Erichsen Test | no peeling |
| | Boiling Test | no change on the surface |
| | Bending Test | no change |
| | Constant temperature humidity test | no peeling |
| | Pencil hardness | >2B |

The invention claimed is:

1. A composite film having a thickness of not more than 1 mm comprising:
   (a) an acrylonitrile styrene acrylate (ASA) copolymer layer having a thickness of 50 to 500 μm;
   (b) a metal layer having a thickness of 0.1 to 50 μm;
   (c) optionally a coloured layer having a thickness of 0.1 to 50 μm; and
   (d) a transparent polymer layer that is a UV-protective, glossy, chemically inert or weatherproof layer and has a thickness of 0.5 to 50 μm,
       wherein said transparent polymer layer comprises one or more types of polystyrene, one or more types of styrene-acrylonitrile copolymer (SAN), one or more types of styrene-butadiene copolymer (SB), one or more types of acrylonitrile butadiene styrene copolymer (ABS), one or more types of polymethacrylate, one or more types of poly(methyl methacrylate), one or more types of (methyl)methacrylate-butadiene-styrene copolymer ((M)MBS), one or more types of acrylonitrile styrene acrylate (ASA), one or more types of styrene-maleic acid anhydride copolymer (SMA), one or more types of styrene-maleic acid anhydride-butadiene copolymer (SMAB), one or more types of styrene butadiene methylmethacrylate copolymer (SBMMA), one or more types of methyl methacrylate acrylonitrile butadiene copolymer, one or more types of polyethylene, one or more types of polypropylene, one or more types of polydimethylsiloxane (PDMS), one or more types of polylactone, one or more types of polyester, one or more types of poly(methyl methacrylate) (PMMA) or a blend of two or more thereof,
   wherein layer (b) is located between layers (a) and (d) and optionally layer (c) is located between layers (b) and (d).

2. The composite film according to claim 1, wherein the ASA copolymer layer (a) comprises a texturized pattern.

3. The composite film according to claim 1, wherein the ASA copolymer layer (a) has a thickness of 50-300 μm.

4. The composite film according to claim 1, wherein the metal layer (b) is an aluminium layer.

5. The composite film according to claim 1, wherein the metal layer (b) has a thickness of 0.5-20 μm.

6. The composite film according to claim 1, wherein said composite film comprises a coloured layer (c) that is a printed layer, which is optionally a pattern printed, pattern embossed or pattern printed and embossed layer, or a hologram in case of no texturized pattern on the ASA copolymer layer (a).

7. The composite film according to claim 1, wherein said composite film comprises a coloured layer (c) that has a thickness of 0.5-20 μm.

8. The composite film according to claim 1, wherein the transparent polymer layer (d) is scratch resistant, or has an elongation of break of at least 10% in a stress/strain test according to ISO 527.

9. The composite film according to claim 1, wherein the transparent polymer layer (d) has a thickness of 2-20 μm.

10. The composite film according to claim 1, wherein said composite film comprises a layer structure of (a)-(b)-(c)-(d) and has a thickness of 100-350 μm.

11. The composite film according to claim 1, wherein said composite film is an adhesive composite film, further comprising at least one adhesive coating on at least one of the two outer surfaces of said composite film.

12. The composite film according to claim 1, wherein the ASA copolymer layer (a) has a thickness of 100-300 μm.

13. The composite film according to claim 1, wherein the metal layer (b) has a thickness of 1-10 μm.

14. The composite film according to claim 1, wherein said composite film comprises a coloured layer (c) that has a thickness of 1-10 μm.

15. The composite film according to claim 11, wherein the at least one adhesive coating is reversibly covered by a strippable non-adhesive film.

16. The composite film according to claim 1, wherein said composite film comprises a layer structure of (a)-(b)-(c)-(d) and has a thickness of 100-350 μm, wherein
   (a) the ASA copolymer layer (a) has a thickness of less than 200 μm;
   (b) the metal layer (b) has a thickness of less than 15 μm;
   (c) the coloured layer (c) a thickness of less than 15 μm;
   (d) the transparent polymer layer (d) a thickness of less than 20 μm.

17. The composite film according to claim 3, wherein the texturized pattern is a stainless steel hairline pattern.

18. The composite film according to claim 1, wherein said composite film is an adhesive composite film, further comprising an adhesive coating on the surface of said composite film on surface of the ASA copolymer layer (a) opposed to its surface adjacent to the metal layer (b).

* * * * *